United States Patent Office 3,409,600
Patented Nov. 5, 1968

3,409,600
ESTERS OF 4,4-DI TERT.BUTYLPEROXYPENTANOIC ACID AS CROSS-LINKING INITIATORS IN THE MANUFACTURE OF COPOLYMERS OF ETHYLENE AND OTHER TERMINAL ETHYLENICALLY UNSATURATED MONOMERS
Pieter R. A. Maltha and Stephanus B. Tijssen, Schalkhaar, Netherlands, assignors to Koninklijke Industrieele Maatschappij vorheen Noury & van der Lande N.V., Brink, Deventer, Netherlands, a corporation of the Netherlands
No Drawing. Original application Oct. 10, 1963, Ser. No. 315,344. Divided and this application Apr. 19, 1967, Ser. No. 646,785
Claims priority, application Netherlands, Oct. 12, 1962, 284,315
5 Claims. (Cl. 260—87.3)

ABSTRACT OF THE DISCLOSURE

The present invention relates to cross-linking with new organic peroxides which are 3,3-di tert.butylperoxybutane-carboxylic acid esters, also known as esters of 4,4-di tert.butylperoxypentanoic acid, wherein the ester moiety contains a hydrocarbon group having at most 20 carbon atoms, and which are useful as peroxidic cross-linking initiators in the manufacture of copolymers of ethylene and monomers containing $CH_2=CH-$ groups. The invention also relates to the resulting cross-linked copolymeric compositions and to shaped articles made therefrom.

---

This application is a division of our copending application Ser. No. 315,344, filed Oct. 10, 1963.

The present invention relates to the production of copolymers and is particularly concerned with a process for cross-linking copolymers of ethylene and monomers containing $CH_2=CH-$ groups with the aid of hitherto unknown peroxidic cross-linking initiators. The invention also relates to a process for preparing these new peroxides, as well as to the new peroxides per se.

In the cross-linking of copolymers of ethylene and monomers containing $CH_2=CH-$ groups, such as copolymers of (1) ethylene and propylene and of (2) ethylene and vinylacetate, etc., use is often made of dicumylperoxide as an initiator. However, the use of this peroxide as an initiator has the disadvantage that the finished products obtained by its use possess a disagreeable odor. As a consequence, peroxidic initiators such as this cannot be used in many instances.

It has been found, surprisingly, that hitherto unknown peroxides of the general formula

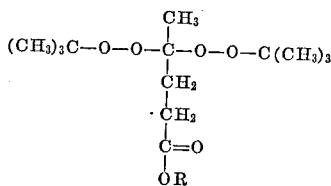

in which R is a hydrocarbon group having at most 20 carbon atoms, are very suitable initiators in the cross-linking of copolymers of ethylene and monomers containing $CH_2=CH-$ groups, because these peroxides do not give a disagreeable odor to the finished cross-linked products and are almost equal in effectiveness to the peroxide most suited to this purpose, namely, dicumylperoxide, so far as their other properties are concerned.

The cross-linking of copolymers of ethylene with the aid of the novel peroxidic initiators according to the present invention may be carried out in the usual apparatus under otherwise conventional conditions of temperature and pressure, and if desired, in the presence of conventional auxiliary agents such as carbon black, sulphur or sulphur-releasing compounds such as tetra-methyl- and tetra-ethylthiouramdisulphide, and accelerators such as diphenylguanidine.

The peroxides to be used according to the present invention may be obtained by reacting tert.butylhydroperoxide, at a temperature of 20°–35° C., with an alkyl-, aryl-, aralkyl-, or cycloalkyl-ester of 3-ketobutane carboxylic acid in stoichiometric proportions, in the presence of an acid-reacting catalyst, and preferably a mineral acid such as a solution of 70% by weight of sulphuric acid in water, and eliminating the water formed during the reaction, plus any water that might be present in the starting material, plus the water in the sulphuric acid solution, by distillation with the aid of an added entrainer, or a suitable dehydrating agent, which may preferably be anhydrous oxalic acid. In the latter case, this organic acid surprisingly acts simultaneously as a catalyst so that when present at the beginning, the use of the mineral acid is superfluous (as shown below in Example 3).

The alkyl-esters of 3-ketobutane carboxylic acid include both straight and branched chain alkyl-esters, especially the n-butylester and the 2-ethylhexylester; the aryl-esters including especially the phenylester; the aralkyl-esters including especially the benzylester; and the cycloalkyl-esters including especially the cyclohexylester.

In order that the present invention in all of its ramifications may be still more readily understood, the following specific examples are given. Where in these examples reference is made to compression, this was determined with the aid of the Williams plastimeter in the same way as described in S.P.E. Journal, 17 (1961) 265–270, but with the added proviso that instead of a weight of 10 kg. a weight of 5 kg. was used.

Example 1

34.4 g. (0.2 mole) of 3-ketobutane carboxylic acid n-butylester were mixed with stirring, in a 3-neckflask of 500 ml. capacity provided with a mechanical stirrer, thermometer and water separator, with 36 g. (0.4 mole) of 100% tert.butylhydroperoxide and with 150 ml. of benzene as an entrainer. Thereafter, also with stirring within 1 minute 0.2 ml. of sulphuric acid (70%) was added dropwise, care being taken that the temperature of the reaction mixture was maintained at 25°–30° C. The water of reaction, as well as the water present in the starting material, was distilled off azeotropically under reduced pressure during the reaction. After separation of the water in the water separator, the benzene was recycled to the three-neckflask.

After the reaction, the reaction mixture was freed from acid by washing subsequently twice with 100 ml. of water, twice with 100 ml. of 2 N NaOH, and finally once again with 100 ml. of water.

After drying over sodium sulphate, the benzene was distilled off under reduced pressure at a final pot temperature of a maximum of 40° C.

68.3 g. of 3,3-di-tert.butylperoxybutanecarboxylic acid n-butylester were obtained, as follows:

Yield, 93%
Peroxide content, 91%
Active oxygen content, 8.72%
$n_{20}$, 1.4290

Example 2

73.6 g. (0.2 mole) of 3-ketobutanecarboxylic acid stearylester were mixed with stirring, in a 3-neckflask of 500 ml. capacity provided with a mechanical stirrer, thermometer and water separator, with 48.0 g. (0.4 mole) of tert. butylhydroperoxide (75%) and with 100 ml. of ditert.

butylperoxide as a carrier. Thereafter, 0.1 ml. of sulphuric acid (70%) was added dropwise with stirring within 1 minute, care being taken that the temperature of the reaction mixture was maintained at 25°–30° C. The water of reaction, as well as the water present in the starting material, was eliminated from the reaction mixture during the reaction by distilling under reduced pressure with the aid of the di-tert.butylperoxide. After separation of the water in the water separator, the di-tert.butylperoxide was recycled to the 3-neckflask. The reaction mixture thus obtained was freed from acid in the same manner as described in Example 1.

After drying over sodium sulphate, the carrier was eliminated by distillation under reduced pressure at a final pot temperature of a maximum of 40° C. 104 g. of 3,3-di-tert.butylperoxybutanecarboxylic acid stearyl ester was obtained, as follows:

Yield, 87%
Peroxide content, 88%
Active oxygen content, 5.33%
Melting point after recrystallisation from methanol, 36°–38° C.

The following peroxides were obtained in an analogous way: 3,3-ditert.butylperoxybutanecarboxylic acid ethyl-, 2-ethylhexyl-, cyclohexyl- and benzyl-ester, respectively:

| Ester of 3,3-di-tert. butylperoxybutane carboxylic acid | Active O-content in percent | Peroxide content in percent | $n_{20}$ | Yield in percent |
|---|---|---|---|---|
| Ethyl | 9.33 | 90 | 1.4289 | 82 |
| 2-ethylhexyl | 6.52 | 80 | 1.4338 | 72 |
| Cyclohexyl | 7.44 | 84 | 1.4457 | 81 |
| Benzyl | 7.31 | 84 | 1.4746 | 80 |

Example 3

In a 3-neckflask of 500 ml. capacity provided with a mechanical stirrer, thermometer and reflux condenser, 19.8 g. (0.22 mole) of anhydrous oxalic acid were added by small increments with stirring to a mixture of 28.8 g. (0.2 mole) of 3-ketobutanecarboxylic acid ethylester and 3.6 g. (0.4 mole) of 100% tert.butylhydroperoxide, care being taken that the temperature of the reaction mixture did not exceed 30° C. The mixture obtained was heated for 3 hours at 30° C. and subsequently cooled, with stirring, to room temperature. Subsequently the solid material present in the reaction mixture was filtered off. The remaining clear solution was, after having been diluted with 100 ml. of benzene, freed from acid in the same way as described in Example 1.

After drying over sodium sulphate, the benzene was distilled off under reduced pressure at a final pot temperature of not more than 40° C. 37.2 g. of 3,3-di-tert.butylperoxybutanecarboxylic acid ethylester were obtained, as follows:

Peroxide content, 81%
Active oxygen content, 8.47%
$n_{20}$, 1.4282

46.0 g. of 3.3-di-tert.butylperoxybutanecarboxylic acid n-butylester were obtained in an analogous way, starting from 34.4 g. (0.2 mole) of 3-ketobutanecarboxylic acid n-butylester, as follows:

Peroxide content, 83%
Active oxygen content, 7.95%
$n_{20}$, 1.4306

With the various products thus obtained, mixtures containing the following parts by weight were made up on a mixing roll at a temperature of 85° C.

| | A | B | C | D | E | F | G | H | J | K | L | M | N |
|---|---|---|---|---|---|---|---|---|---|---|---|---|---|
| Copolymer of ethylene and propylene containing 50% by weight of ethylene | 100 | 100 | 100 | 100 | 100 | 100 | 100 | 100 | | | | | |
| Copolymer of ethylene and vinyl-acetate containing 45% by weight of vinylacetate | | | | | | | | | 100 | 100 | 100 | 100 | 100 |
| HAF Carbon black | 50 | 50 | 50 | 50 | 50 | 50 | 50 | 50 | 50 | 50 | 50 | 50 | 50 |
| Dicumylperoxide | | 2.7 | | | | | | 2.7 | | | | | |
| Ester of 3,3-di(tert.-butyl peroxy)butane carboxylic acid | | | | | | | | | | | | | |
| Ethyl | | | 1.53 | | | | 1.67 | | 1.67 | | | | |
| Butyl | | | | 1.67 | 2.50 | 3.34 | | | | | | | |
| Stearyl | | | | | | | 2.65 | | | | 1.94 | | |
| 2-ethylhexyl | | | | | | | | | | | | 1.84 | |
| Benzyl | | | | | | | | | | | | | 1.80 |
| Cyclohexyl | | | 0.32 | 0.32 | 0.32 | 0.48 | 0.64 | 0.32 | | | | | |
| Sulphur | | | | | | | | | 2 | 2 | 2 | 2 | 2 |
| Diphenylguanidine | | | | | | | | | | | | | |
| Triallylcyanurate | | | | | | | | | | | | | |

The mixtures thus obtained were cross-linked by working in a press at 165° C. for a period of 40 minutes. After 30 minutes at a temperature of 120° C., the compression of samples from sheets thus obtained were determined. The results were as follows:

| Sheet | Compression in percent | Sheet | Compression in percent |
|---|---|---|---|
| A | 62 | G | 6 |
| B | 4 | H | 9 |
| C | 11 | J | 3 |
| D | 10 | K | 5 |
| E | 7 | L | 4 |
| F | 5 | M | 5 |
| | | N | 4 |

With the exception of sheets B and J, the sheets did not possess a disagreeable odor.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. In a process for cross-linking a copolymer of ethylene and a monomer containing a $CH_2=CH-$ group with the aid of a peroxidic initiator, the improvement comprising employing as an initiator a compound having the general formula

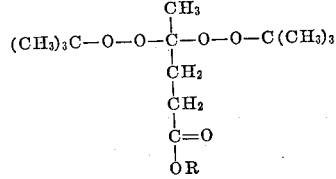

in which R is a hydrocarbon group having not more than 20 carbon atoms.

2. A process as defined in claim 1, in which the cross linking is carried out in the presence of at least one added auxiliary agent.

3. An article comprising a cross-linked copolymer of ethylene and a monomer containing a $CH_2=CH-$ group obtained by the process defined in claim 1.

4. A new composition of matter comprising a copolymer of ethylene and a monomer containing a CH$_2$=CH— group, and an organic compound having the general formula

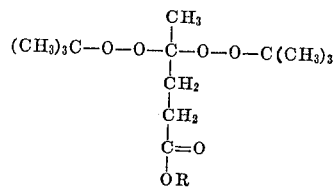

in which R is a hydrocarbon group having not more than 20 carbon atoms.

5. A new composition of matter as defined in claim 4 containing in addition at least one added auxiliary agent.

No references cited.

JOSEPH L. SCHOFER, *Primary Examiner.*

M. B. KURTZMAN, *Assistant Examiner.*

Notice of Adverse Decision in Interference

In Interference No. 99,279, involving Patent No. 3,409,600, P. R. A. Maltha and S. B. Tijssen, ESTERS OF 4,4-DI TERT. BUTYLPEROXYPENTANOIC ACID AS CROSS-LINKING INITIATORS IN THE MANUFACTURE OF COPOLYMERS OF ETHYLENE AND OTHER TERMINAL ETHYLENICALLY UNSATURATED MONOMERS, final judgment adverse to the patentees was rendered Jan. 18, 1977, as to claims 3 and 4.

[*Official Gazette May 3, 1977.*]